(12) United States Patent
Cezario

(10) Patent No.: US 9,843,236 B2
(45) Date of Patent: Dec. 12, 2017

(54) HEAT EXCHANGE SYSTEM FOR CASINGS OF ROTARY ELECTRIC MACHINES

(71) Applicant: WEG EQUIPAMENTOS ELÉTRICOS S.A. - MOTORES, Jaraguá do Sul (BR)

(72) Inventor: Cassiano Antunes Cezario, Jaragua do Sul (BR)

(73) Assignee: WEG Equipamentos Eletricos S.A.-Motores, Jaragua do Sul-SC (BR)

( * ) Notice: Subject to any disclaimer, the term of this patent is extended or adjusted under 35 U.S.C. 154(b) by 146 days.

(21) Appl. No.: 14/650,155

(22) PCT Filed: Dec. 21, 2012

(86) PCT No.: PCT/BR2012/000541
§ 371 (c)(1),
(2) Date: Jun. 5, 2015

(87) PCT Pub. No.: WO2014/094082
PCT Pub. Date: Jun. 26, 2014

(65) Prior Publication Data
US 2015/0318757 A1    Nov. 5, 2015

(51) Int. Cl.
*H02K 5/18* (2006.01)
*F28F 3/02* (2006.01)
*H02K 15/02* (2006.01)
*F28F 13/06* (2006.01)

(52) U.S. Cl.
CPC ............ *H02K 5/18* (2013.01); *F28F 3/02* (2013.01); *F28F 13/06* (2013.01); *H02K 15/02* (2013.01); *F28F 2215/04* (2013.01)

(58) Field of Classification Search
CPC ................. F28F 2215/04; H02K 5/18
USPC ................................................. 310/89
See application file for complete search history.

(56) References Cited

U.S. PATENT DOCUMENTS

| 5,630,461 A | * | 5/1997 | CoChimin | B22C 9/046 164/34 |
| 5,763,969 A | * | 6/1998 | Metheny | H02K 11/33 310/52 |
| 5,877,576 A | * | 3/1999 | CoChimin | B22C 9/046 310/418 |
| 6,011,335 A | * | 1/2000 | Belley | H02K 5/06 310/418 |

(Continued)

FOREIGN PATENT DOCUMENTS

| DE | 202008006366 U1 | 7/2008 |
| EP | 0917275 A1 | 5/1999 |
| JP | 7154940 A | 6/1995 |

*Primary Examiner* — Naishadh Desai
(74) *Attorney, Agent, or Firm* — Stites & Harbison PLLC; Mandy Wilson Decker; Rachel Rutledge

(57) ABSTRACT

A heat exchange system for casings of rotary electric machines is described herein. The heat exchange system applied to the rotating electrical machine casing and the machine is equipped with a finned casing comprising a number of fins equipped with a modified profile, each one interleaved with complementary fins, both profiles distributed over the external surface of the casing. The fins have a predominantly continuous profile, supported in parallel along the casing height, and respectively show projections from a guideline, with structures with trapezoidal or rectangular section being interleaved to one another in a front region of the machine.

9 Claims, 2 Drawing Sheets

(56) References Cited

U.S. PATENT DOCUMENTS

| | | | |
|---|---|---|---|
| 7,027,938 B1* | 4/2006 | Dister | B60L 3/0023 |
| | | | 702/188 |
| 7,675,209 B2* | 3/2010 | Masoudipour | H02K 5/20 |
| | | | 310/57 |
| 7,880,348 B2* | 2/2011 | McElveen | H02K 5/18 |
| | | | 310/216.056 |
| 2003/0184172 A1* | 10/2003 | Ghiotto | H02K 5/225 |
| | | | 310/89 |
| 2008/0042502 A1* | 2/2008 | VanLuik | H02K 1/32 |
| | | | 310/89 |
| 2008/0231126 A1* | 9/2008 | Telore | H02K 5/20 |
| | | | 310/59 |
| 2009/0289513 A1* | 11/2009 | Vadillo | H02K 9/14 |
| | | | 310/62 |
| 2011/0278970 A1 | 11/2011 | Lau et al. | |

* cited by examiner

Prior art

HEAT EXCHANGE SYSTEM FOR CASINGS OF ROTARY ELECTRIC MACHINES

APPLICATION FIELD

This invention discloses a heat exchange system for rotating electrical machine casing comprising a singular distribution of fins in its front region, in a way to locally increment the convection coefficient and consequently increase the heat exchange without impacting the steps of casting and finishing of the finished product. In another aspect, the invention discloses a rotating electrical machine comprising the system now purposed.

BACKGROUND OF THE INVENTION

One of the factors that define the complexity degree of a finned casing of a rotating electrical machine is the height per distance ratio between the fins; such ratio affects the casting process and the finishing process of the finished product, especially in painting. An optimization of the fins aiming at maximizing the convection coefficient may result in a minimization of this ratio without compromising the heat exchange in most part of the casing surface. However, it is unavoidable that along the casing height the convection coefficient is reduced, especially in the front region, once the air flowing speed intensity experiences reduction in function of the distance run and of the respective spacing regarding ventilation system basically due to intrinsic losses to the air flowing displacing process. In turn, the convection coefficient is directly correlated with the air speed and the heat exchange area.

DESCRIPTION OF THE STATE OF THE ART

In the state of the art, there are some proposals trying to overcome the convection coefficient reduction along the casing height. One of the most common comprises forming the "labyrinth structures", exploring the discontinuity of the casing fins, thus benefiting the air flowing. One example is disclosed in the document JP9093865, wherein it discloses an induction engine equipped with discontinuous fins axially arranged along the casing external surface and equipped with deflectors in its distal end.

In the same way, the document JP7321847 explores an arrangement of segregated fins, interleaved to one another; other similar purpose is disclosed in the patent CN201877950, in which it has a heat dissipation device for engines comprising the use of an air flowing source.

Alternatively, there are projects fitting the fin profile as a way to minimize the fall in the air flowing speed. As illustrative of these embodiments, we have the documents DE2139409 and JP59226635, in which a method to assembly tapered plates in electrical engines casings is disclosed.

It is noted from the background that the common projects show a reasonable constructive complexity affecting in the manufacturing costs, besides difficulting the product finishing final steps, such as the process to eliminate the burrs in the casted part and the painting. In the latter, for example, a previous inspection must be performed in the product, aiming at checking the existence of residues (oil, grease, sand, or welding residues). In the sequence, there are the cleaning steps (blasting or abrasive hydro blasting, sandpaper, among others), in which the operational conditions of the electrical machine will determine the painting type. In the documents previously mentioned, it is possible to distinguish that the lack of spatial uniformity between the casing fins makes it difficult a homogeneous application of paint, besides demanding a greater attention in the quality control, in order to avoid irregularities, which may feature defects in the finishing.

Regarding the casting, it must be considered that most part of the manufacturing processes produce a surplus of burrs, thus being necessary to remove them from the rotating electrical machine casing. The construction of structures finned in labyrinth or segregated constitutes a clear disadvantage regarding this factor, once additional care is needed when removing these edges of the finished product.

FIGS. 1a and 1b illustrate a traditional project of a rotating electrical machine casing equipped with a number of fins with axially arranged even cross-section along the external surface of the casing. In this conception, the drawbacks/difficulties around the painting and casting previously described are determined by the height per distance ratio between the fins and keep themselves constant along the casing height. However, a reduction in the convection coefficient takes place along the casing height, due to the air flowing speed reduction. The heat exchange area increment, through the height per distance ratio increment between the fins, directly affects the increment of the manufacturing and painting difficulty degree, so there is a demand for products presenting a suitable heat efficiency without damaging the manufacturing process.

OBJECT OF THE INVENTION

This invention aims at overcoming the disadvantages of the state of the art, disclosing an alternative purpose of the rotating electrical machine casing, equipped with modified geometry fins, interleaved with the neighbor fins, in the front longitudinal region, in which the heat exchange area increment occurs, free of cost to the manufacturing process.

In one aspect of the present invention, a heat exchange system is disclosed and applied to the rotating electrical machine casing, in which an increment in the convection coefficient is provided through the increase placed in the heat exchange area, without charging the manufacturing complexity, including the painting process.

In another aspect of the present invention, a rotating electrical machine casing is disclosed, comprising the heat exchange system now proposed.

DETAILED DESCRIPTION OF THE INVENTION

Figure 1A:
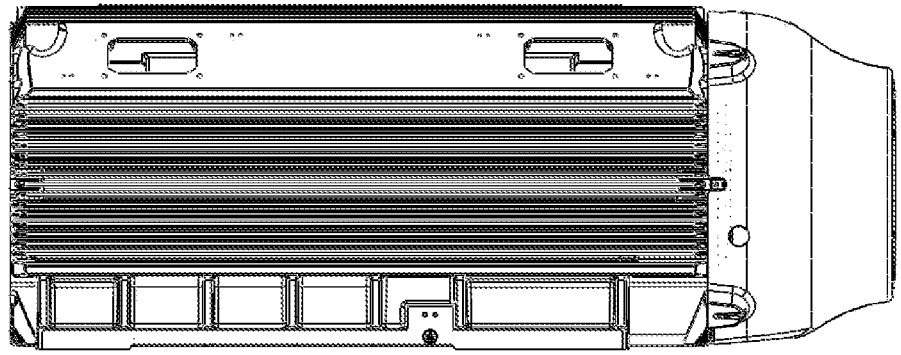
FIGS. 1a and b illustrate a rotating electrical machine casing pertinent to the state of the art.
Figure 1B:
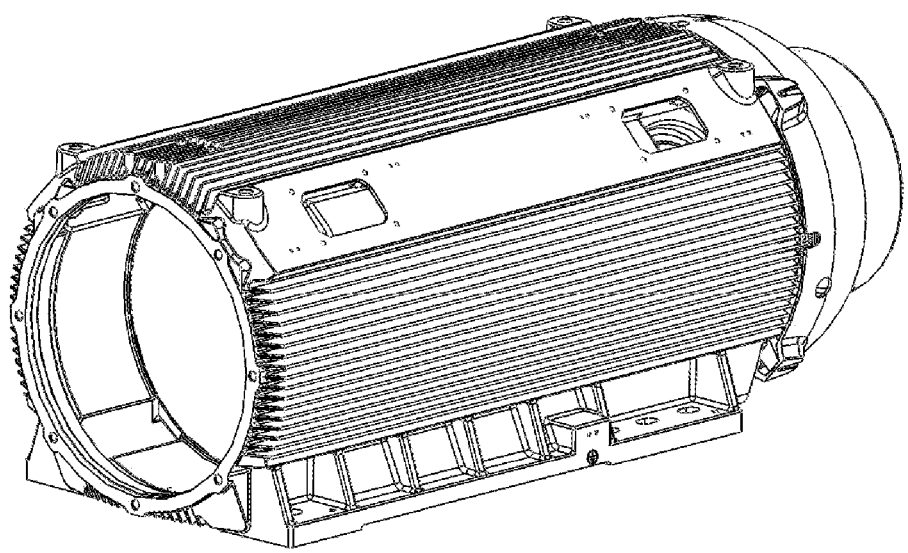
Figure 2:
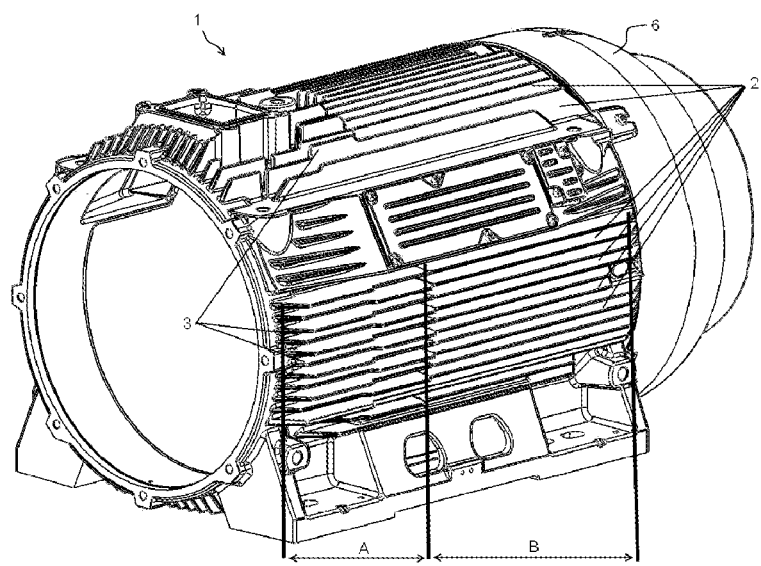
FIG. 2 illustrates a bent view of the rotating electrical machine casing.
Figure 3:
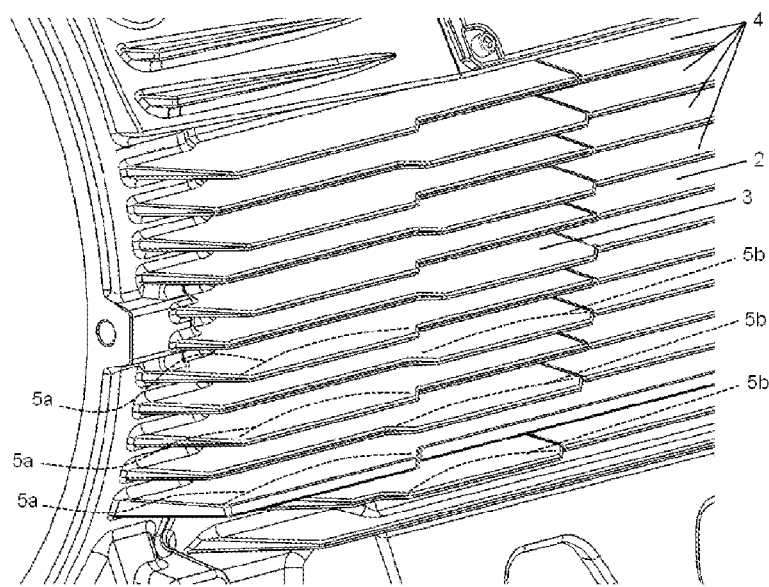
FIG. 3 illustrates a detail from the bent lateral view of the rotating electrical machine casing.

FIGS. 2 and 3 represent an embodiment of a rotating electrical machine comprising the proposed system. For reference purposes, the casing (1) is subdivided into a front portion (A) and a rear portion (B). It is adopted by convention that the (A) previous region is that in communication with the front lid (not showed in the figures) of a rotating electrical machine, while the (B) subsequent portion will correspond to the casing region proximal to the fan assembly (not showed in the figures) and the deflector lid (6).

FIG. 2 in a preferential embodiment illustrates an external view in the casing perspective (1), equipped with a number of fins (2) equipped with a modified and interleaved profile of the fin (3) in the front portion (A). The fins (2) and their modified and interleaved profile of the fin (3) in the front portion (A) are distributed over the side parts, in the upper and bottom parts of the external surface of the casing (1). The fins (2) and their modified and interleaved profile of the fin (3) in the front portion (A) generally show a predominantly continuous profile, being supported in parallel along the casing height (1). The structural distinction between said fins (2) and their modified and interleaved profile of the fin (3) in the front portion (A) flows through the location of its respective projections (5a) and (5b) from the guideline (4), as will be detailed in the following.

FIG. 3 illustrates an approximated view of the portion (A) of the casing. As can be noted, the region (A) is characterized by presenting a series of structures (5a) and (5b) with trapezoidal or rectangular section interleaved to one another. The structures (5a) and (5b) alternate along the guideline (4) of each fin (2) and its modified and interleaved profile of the fin (3) in the front portion (A). Considering as a reference the regions (A) and (B), it is noted that the structure (5a) projects along the guideline (4) in a proximal way regarding the front and distal lids in relation to the deflector lid (6). Alternately, fins (3) are arranged in parallel and interleaved to the first fin (2); in the first fin, the structure (5b) is subsequently projected regarding the structure (5a) of the fin (2) and more distally regarding the front lid. With the heat exchange rate depending on the convection area, room temperature and convention coefficient, the area increase in the front portion (A) is the most viable solution in this sense and without generating additional costs. It is noted that the structure (5a) and (5b) alternation reduces and allows the increment of the heat exchange area in the front portion (A) without penalizing the height per distance ratio among the fins.

Preferably, each fin type (2, 3) projects only one structure (5a or 5b). Also in a preferential form, the fin heights (2) must be even along the casing height, and the cooling fluid must be the air. Optionally, the side parts of each fin type (2) and (3) may be reinforced, aiming at preventing damages during the subsequent steps of casting.

In an alternative configuration, the structures (5a) and (5b) with trapezoidal or rectangular section interleaved to one another may repeat, alternating, for more than one time along the region (A).

In another alternative configuration, the structures (5a) and (5b) with trapezoidal or rectangular section interleaved to one another may extend, alternating in the front portion (A) and also along the rear portion (B).

Obviously, it will be noted that other modifications and variations are considered within this invention scope, not restricting to what was previously exposed.

The invention claimed is:

1. A finned casing of a rotating electrical machine, the finned casing comprising
   a) a number of fins, distributed over sides parts, upper and bottom part of an external surface of the casing, and extending over front and rear regions of the casing;
   b) the number of fins comprise primary and complementary fins alternately arranged on the casing;
   c) the number of fins comprising trapezoidal or rectangular projections in height dimension, wherein the projections are formed on different positions of the primary fins and complementary fins length, the projections are staggered with respect to a neighboring fin, and wherein the projections are arranged in the front region of the casing.

2. The finned casing according to claim 1, wherein the projections of the primary fins are located closer to a front lid of the casing than to a deflector lid of the casing.

3. The finned casing according to claim 1, wherein primary fin and the complementary fin repeat, alternating for more than one time along a region.

4. The finned casing according to claim 1, wherein the projections extend, alternating in the front region and also along a rear region.

5. The finned casing according to claim 1, wherein the projections of the compementary fins are located and more distally regarding the front lid than the projections of the primary fins.

6. A heat exchange system, comprising:
   a rotating electrical machine equipped with the finned casing of claim 1.

7. The heat exchange system according to the claim 6, wherein the primary and complementary fins repeat, alternating for more than one time along the front region.

8. The heat exchange system according to the claim 6, wherein the projections extend, alternating in the front region and also along a rear region.

9. The heat exchange system according to the claim 6, wherein a cooling fluid is air.

* * * * *